United States Patent Office 3,516,314
Patented June 23, 1970

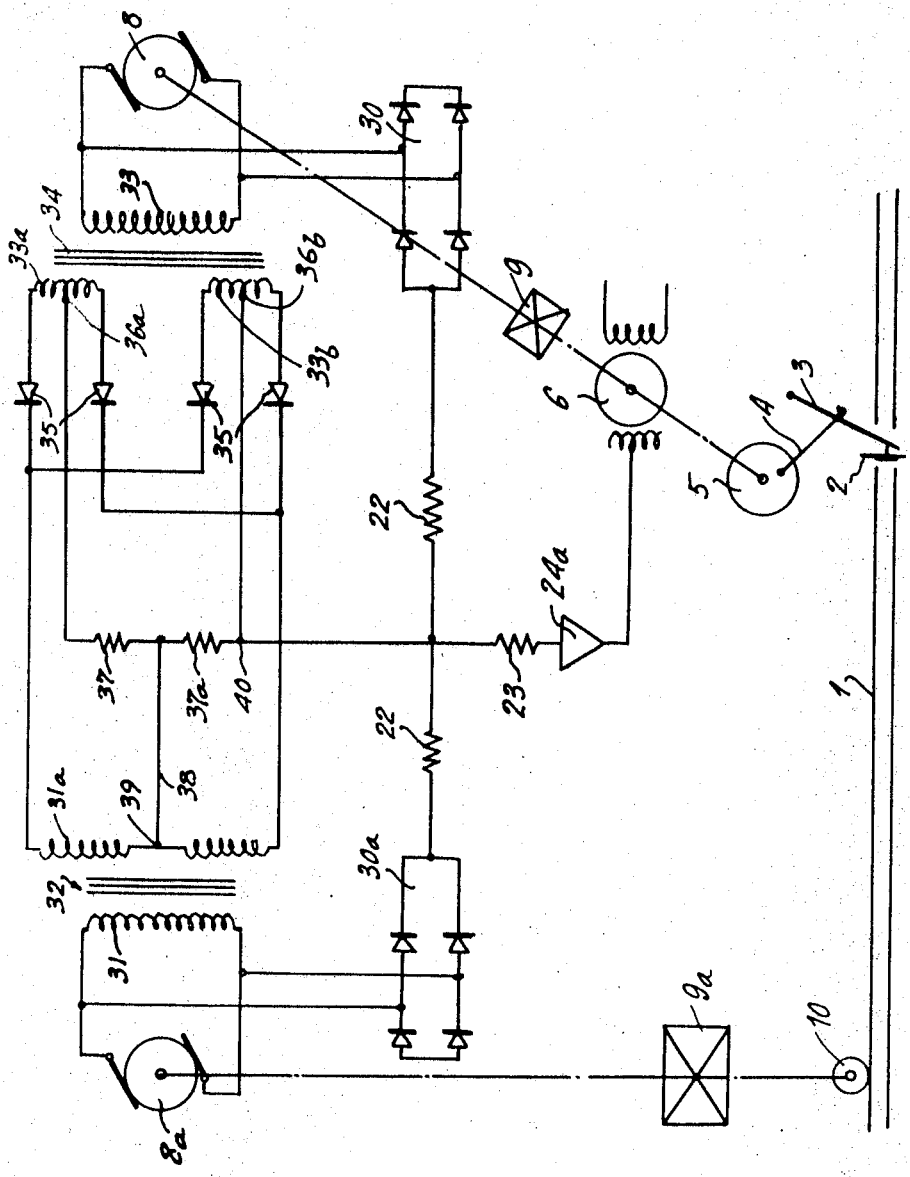

3,516,314
DEVICE FOR SUBJECTING THE MOVEMENT OF A TRAVELLING SAW TO THE ADVANCE SPEED OF A WORK PART TO BE CUT BY SAID SAW
Alain Edouard Plegat, Asnieres, France, assignor to Societe Anonyme des Usines Chausson, Asnieres, France, a company of France
Filed Feb. 12, 1968, Ser. No. 704,735
Claims priority, application France, Feb. 17, 1967, 95,441
Int. Cl. B23d 25/16, 1/56
U.S. Cl. 83—295
3 Claims

ABSTRACT OF THE DISCLOSURE

The device for subjecting the movement of a travelling saw to the advancing speed of a work part to be cut by said saw comprises two alternators, one being driven by a member for reading the speed of the work part to be cut, the other being driven by a variable speed electric motor controlling the working of the travelling saw, an analysis circuit at least of the voltages coming from the two alternators being provided for producing a signal ensuring the regulating of the speed of said motor driving the travelling saw.

---

The present invention relates to a device for subjecting the movement of a travelling saw to the advance speed of a work part to be cut.

In the technique, there already exist devices for synchronising a travelling saw with a work part to be cut. This is the case in machines for cutting thin tubes for radiators in which a pendular movement travelling saw is connected by mechanical elements to an embossed wheel which is itself directly driven by the tube to be cut into equal length sections. These devices give satisfaction so long as the advancing speed of the work part to be sawn is not too high, for instance, not exceeding 100 m./mn. Actually, when the speed becomes greater, there is a slipping of the reading embossed wheel in relation to the tube which it carries along, for this embossed wheel must transmit a considerable stress to the members controlling the movement of the travelling saw whose inertia is considerable.

Partly to palliate this disadvantage, it has been proposed to facilitate the movement of the travelling saw by interposing an electric motor in the circuit of its drive, so that the energy emanating from the embossed reading wheel itself is appreciably reduced. However, it has proved that it was not possible considerably to increase the working speed and obtain sufficient accuracy for the cut. This situation has appeared to be harmful, for, in particular in the radiator industry, tubes are manufactured at a very high speed, particularly clipped tubes, or even, tubes formed by bending a strip whose edges are then soldered together.

The present invention now enables, by its putting into operation to ensure the cutting into equal length sections, with a very great accuracy, of tubes, wires or other similar objects advancing at high speed, for example, in the region of 300 m./mn., and this without any risk of slipping of the embossed wheel or of any other reading member of the advancing speed of the tube to be cut into sections.

According to the invention, the device comprises two alternators of which one is driven by a member for reading the speed of the work part to be cut and of which the other is driven by a variable speed electric motor controlling the working of the travelling saw, an analysing device at least of the voltages coming from the two alternators being provided for producing a signal ensuring the regulating of the speed of said driving motor for the travelling saw.

Various other characteristics of the invention will moreover be revealed by the detailed decription which follows.

A form of embodiment of the invention is shown, by way of non-restrictive example, in the accompanying drawing.

FIG. 2 is a diagram of a particular form of embodiment of the invention.

Figure 1:
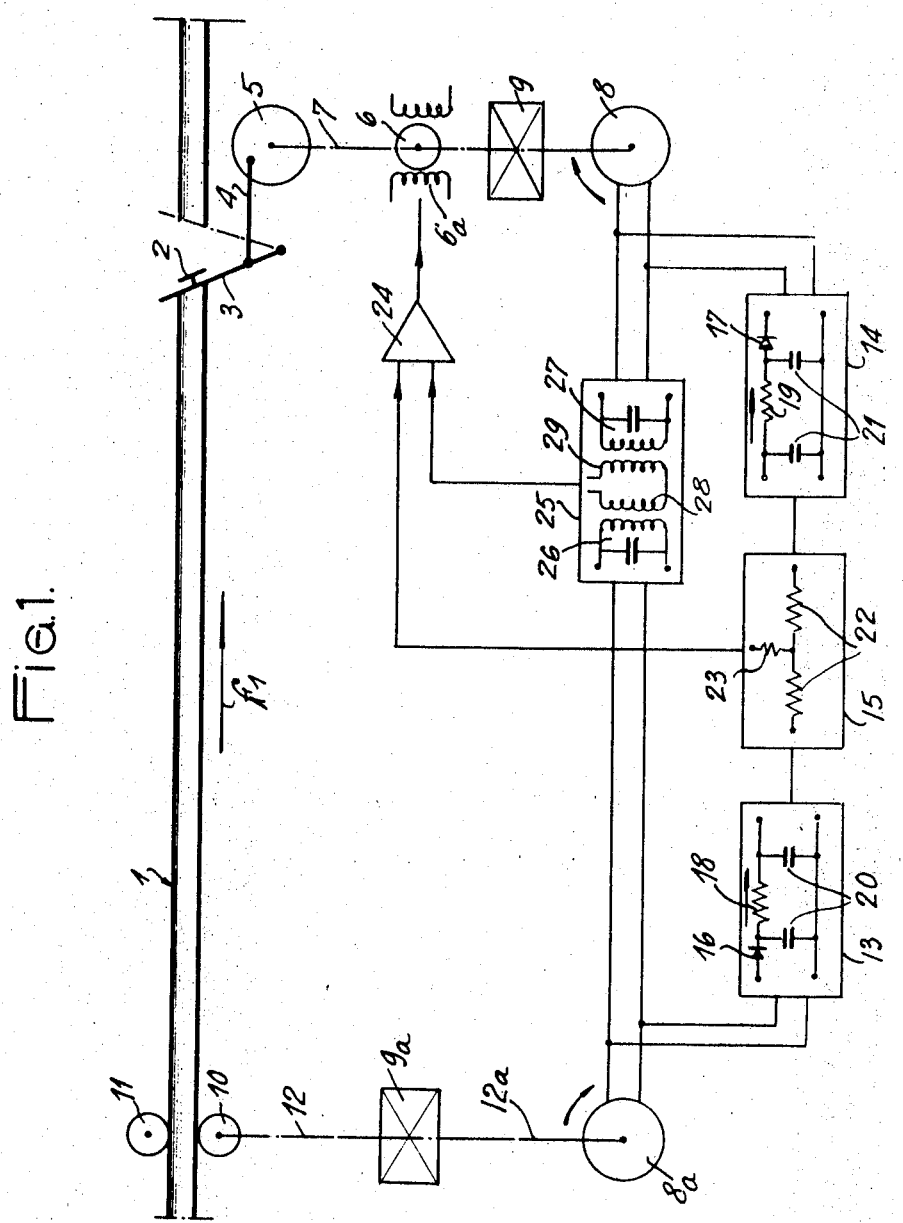
FIG. 1 is a synoptic diagram of the device for driving the saw of the invention.

The device for controlling the cut into the predetermined length of sections of a tube 1 continuously advancing, for example, in the direction of the arrow $f_1$, comprises a saw 2 of the pendulous type, i.e., mounted on an oscillating arm 3. The particular mechanical structure of the pendular assembly of the saw support can be of any kind, for example, as described in French Pat. No. 1,106,-736, and because it does not directly form part of the invention it is not described in more detail. On this account, the drive of the pendular arm 3 has been simply shown by a connecting rod 4 driven by an eccentric 5. The eccentric 5 or other driving member is directly driven by a variable speed electric motor 6, which, by its second shaft 7, also drives an alternator 8 by a variable ratio step-up gear 9 which is advantageously made by a mechanical gear box. In that which follows, the alternator 8 is designated as a regulating alternator on account of its function.

For ascertaining the advancing speed of the tube 1, a reading embossed wheel or roller 10 is used, cooperating with a presser roller 11 so that said reading roller 10 is driven by the tube 1 for cutting, without any slipping occurring. The reading embossed wheel 10 is keyed on to the secondary shaft 12 of a variable ratio mechanical step-up gear 9a identical to the step-up gear 9 and synchronised with it so that when one of the step-up gears operates on a given ratio, the other step-up gear operates on the same ratio.

The output shaft 12a of the step-up gear 9a drives an alternator identical to the alternator 8 and called in the following reading alternator. The two alternators, regulating 8 and reading 8a, are very low powered machines whose number of poles is chosen so that they produce a relatively high frequency alternating current, for instance, in the region of 400 periods/second. The variable ratio step-up gears 9 and 9a enable the maintaining, in a relatively narrow range, of the current frequency produced by the alternators, whatever the advancing speed of the tube 1, i.e., within the limits provided for using the machine, for example, for an advancing speed of the tube that may vary in a bracket of 50 to 500 m./mn.

As shown by the drawing, the voltage coming from the two regulating 8 and reading 8a alternators is applied on rectifier assemblies 13 and 14 acting to supply a differential current 15 in which the voltages, coming from said alternators 8, 8a and suitably rectified, are placed in opposition to produce a resultant signal affording the knowledge as to which of the two alternators is producing the lowest voltage, and consequently, which of the two alternators revolves the slower.

Both the rectifying assemblies 13, 14 and differential circuit 15 can be produced in numerous ways by electronic means, consequently they do not themselves form part of the invention, because any electronic technician can imagine without difficulty various embodiments for forming these assemblies and circuit enabling the result sought and explained in the foregoing to be obtained. Nevertheless by way of example, we have shown in FIG. 1 that the assemblies 13 and 14 can, for instance, respectively include rectifying cells 16, 17 associated respectively with resistances 18, 19, and filtering condensers, 20 and 21 respectively. Moreover, the differential circuit in which the voltages are put into opposition can be formed by simple resistances 22 and 23, the two resistances 22 having the same magnitude, likewise the two resistances 18 and 19 of the rectifying assemblies.

By planning to mount the rectifying cells 16 and 17 so that they enable the passage of rectified current only in the direction shown by the arrows when the reading alternator 8a turns faster than the regulating alternator 8, it results from this that the current is led to pass into the resistance 23, the signal thus caused is applied to one of the inputs of an amplifier 24 from which the variable speed motor 6 is governed, by acting, for example on its inducting windings 6a.

When current no longer traverses the resistance 23, this means that the voltage at the terminals of the alternators 8a and 8 is the same, and consequently, the two alternators 8a and 8 turn at the same speed, one being driven by the tube 1 and the other by the motor 6 which itself drives the saw 2, so that there is a synchronism between the working speed of the latter and the advancing speed of the tube.

In the foregoing, it has been stated that the regulating 8 and reading 8a alternators were monophased alternators. In a case where it is deemed desirable to use multiphased alternators, then each of the phases is rectified in rectifying bridges and the continuous voltages obtained are respectively applied to each of the resistances 22.

To still further complete said synchronism, a phase discriminating device 25 is provided which is connected to each of the two alternators 8a and 8. This phase discriminating device can also be produced in numerous different ways, and by way of example, it has been shown in FIG. 1, formed by two oscillating circuits 26, 27 provided to subject coils 28 and 29 mounted in opposition for supplying a positive or negative signal which is applied to a second input of the amplifier 24.

It is advantageous that the second input of the amplifier 24 should not be open when the principal signal provided from the resistance 23 becomes null.

As previously, the information given by the phase discriminator 25 causes a regulating of the speed of the motor 6 so that, when the two alternators 8a and 8 are in phase synchronism, it is assured that the speed at which the motor 6 drives the saw 2 rigorously corresponds to the advancing speed of the tube 1, thereby enabling a very great cutting accuracy to be obtained, whatever the advancing speed of the tube 1, and this without any risk of slipping between the tube 1 and the embossed reading wheel 10 seeing that the power absorbed by the wheel 10 is very low.

In FIG. 2 is shown another advantageous method of embodiment of the phase discriminator necessitating only one amplifier 24a with a single input, for this discriminator can be associated without special precautions with the device putting the voltages into opposition coming from the reading 8a and regulating alternators 8. To show how little it matters to use mono- or multiphased alternators, FIG. 2 shows disphased alternators of which the two phases are connected to rectifying bridges 30 and 30a which are themselves electrically connected and in a similar manner to what is shown in FIG. 1, respectively to the resistances 22 by which the two rectified voltages, coming from the alternators 8 and 8a are put in opposition, the voltage coming from the reading alternator 8a when it is greater than that coming from the regulating alternator 8, being applied by the resistance 23 to the input of the amplifier 24a, to modify the rotation speed of the variable speed motor 6 driving the eccentric 5.

For acting as a phase discriminator between the two alternators 8 and 8a, the two phases of the reading alternator 8a are connected on the primary winding 31 of a transformer 32 comprising a secondary winding 31a having a terminal at its middle point and the phases of the regulating alternator 8 are connected on the primary winding 35 of a second transformer 34 comprising two separate secondary windings 33a, 33b each one having a terminal in the middle of the winding.

The drawing shows that the end terminals of the two secondaries 33a and 33b are respectively connected by rectifying cells 35 to the end terminals of the secondary 31a and, moreover, the middle points 36a, 36b of said two secondaries are connected to the ends of two identical resistances 37, 37a mounted in series and connected, at their junction point, by a conductor 38 to the middle point 39 of the secondary 31a. The resistance 37a is, moreover, connected to the junction point of the resistances 22, and consequently, by means of the resistance 23 to the input of the amplifier 24a.

By the above-mentioned construction, and by properly calculating the windings of the transformers, voltages obtained at the end terminals of the secondaries 31a, on the one hand, and 33a, 33b on the other, are null, whereas the voltage at the middle point 39 of the secondary 31a is greater than the voltages at the middle points 36a and 36b of the secondaries 33a and 33b, voltages which, moreover, are equal.

Figure 3:
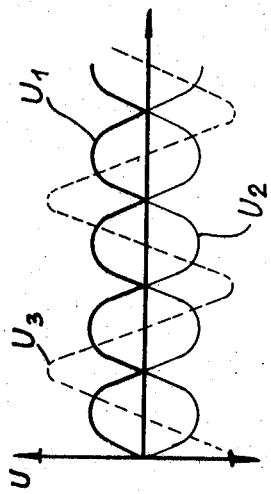
FIG. 3 illustrates explanatory curves showing electric phenomena produced in the embodiment of FIG. 2.

As shown by the curve of FIG. 3 and the presence of the rectifying cells 35 which rectify the two alternations of the two phases of the alternating current coming from the regulating alternator 8, we obtain at the end terminals of the resistances 37, 37a, rippled rectified voltages $U_1$ and $U_2$ in phase opposition, i.e., staggered by 180°, and consequently, these voltages cancel themselves out.

By construction, we furthermore provide that the voltage $U_3$ at the point 39 of the secondary winding 31a is dephased by 90° in relation to the voltages $U_1$ and $U_2$ when the speeds of the alternators 8 and 8a are equal.

Figure 4A:
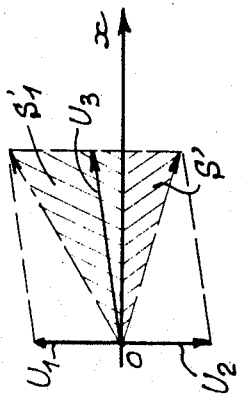
FIGS. 4 and 4a are diagrams explaining the working of one part of the device.
Figure 4:
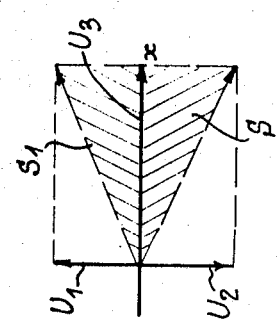

Consequently, by showing symbolically, as in FIG. 4, the voltages $U_1$ and $U_2$ by equal vectors and staggered by 180° and the voltage $U_3$ by a vector staggered by 90° in relation to the vectors $U_1$ and $U_2$, it is seen that no signal can be integrated by the amplifier 24a, for, if the diagram of the forces represented by said vectors is made, the surfaces S and $S_1$ are equal. On the other hand, if the speed of the regulating alternator 8 is not equal to that of the reading alternator 8a, whereas the voltage $U_3$ at the point 39 is no longer staggered by 90° in relation to the voltages $U_1$ and $U_2$ and, in looking at FIG. 4a, it is seen that the vector $U_3$ forms an angle with the axis Ox with which it was previously intermingled. It results from this that the zones S' and $S'_1$ no longer have the same surface, which shows that a non-null voltage then appears at the point 40 and is hence applied to the input of the amplifier 24a, which delivers then a power proportional to the difference between the surfaces of the zones $S'_1$ and S'.

It should be noticed that the dephasing of the voltage $U_3$ can be produced beforehand or afterwards, according as the variable speed motor 6 revolves more or less quickly than the reading alternator 8a. The vector showing the voltage $U_3$ then turns in one direction or the other around the point O and the voltage applied to the amplifier being always a function of the surface difference of the zones S' and $S'_1$, this voltage becomes negative or positive, so that the inducing windings of the motor 6 is influenced in one direction or the other up to the moment when it rigorously revolves in synchronism with the reading alternator.

The arrangement described above has the advantage that with the exception of the reading 8a and regulating 8 alternators, all the members forming part thereof are static members and as the speed variations between said reading and regulating alternators are always expressed by voltage variations, it is of no importance that the two comparison devices, namely, the one comprising the resistances 22 by which the voltages coming from the two alternators are put in opposition, and that which has just been described comparing the phases of these alternators, be connected in one and the same circuit ending at the sole input of the amplifier 24a acting for controlling the inducting windings of the variable speed motor 6.

The invention is not retricted to the example of embodiment, shown and described in detail for various modifications can be applied to it without going outside of its scope.

I claim:

1. A device for subjecting the movement of a travelling saw to the advancing speed of a work part to be cut by said saw comprising a member for reading the speed of the work part to be cut, a variable speed electric motor controlling the working of the travelling saw, two alternators, one being driven by said member, the other being driven by said variable speed electric motor, a voltage analysis circuit at least one of the voltages coming from the two alternators for producing a signal ensuring the regulation of the speed of said variable speed electric motor, said voltage analysis circuit comprising rectifying assemblies for the different phases of said two alternators, a differential circuit estimating the voltages coming from said alternators and producing a signal which is applied to an amplifier controlling the inducting windings of said variable speed electric motor, and a frequency discriminating assembly for the currents coming from the two alternators, said frequency discriminating device producing a signal which is then amplified for varying the driving speed of the variable speed electric motor up to the moment when the frequencies of the two alternators are rigorously in synchronism, said frequency discriminating assembly comprising two tuned circuits respectively belonging to each of said two alternators, and a receiving circuit estimating the dephasing of said tuned circuits for applying a signal corresponding to, this dephasing at the input of the amplifier controlling the supply of the inducting windings of said variable speed electric motor.

2. A device according to claim 1 wherein speed variators are interposed between said member for reading the speed of the work part and the first alternator on the one hand, and between the variable speed electric motor of the saw and the second alternator driven by said motor on the other hand, the variation ratio of said two speed variators being synchronised and determined so that said alternators produce a current of several hundreds of periods, whatever the advancing speed of the work part.

3. A device for subjecting the movement of a travelling saw to the advancing speed of a work part to be cut by said saw comprising a member for reading the speed of the work part to be cut, a variable speed electric motor controlling the working of the travelling saw, two alternators, one being driven by said member, the other being driven by said variable speed electric motor, a voltage analysis circuit at least one of the voltages coming from the two alternators for producing a signal ensuring the regulating of the speed of said variable speed electric motor, said voltage analysis circuit comprising rectifying bridges respectively connected to said two alternators and connected to two opposed resistances between which is branched the input of the amplifier, three transformers for ensuring phase discrimination, two of said transformers being fed by the alternator driven by the variable speed electric motor produce two equal voltages constantly dephased by 180°, the third of said transformers being fed by the alternator driven from the reading device produces a voltage dephased by 90° in comparison to the voltages of said first two transformers, so that any dephasing of this latter voltage caused by a speed difference between the alternator driven by the variable speed electric motor gives rise to a voltage which is applied at the input of the amplifier controlling the feed of said variable speed electric motor.

References Cited

UNITED STATES PATENTS

| | | | |
|---|---|---|---|
| 2,785,354 | 3/1957 | Baker | 83—311 X |
| 2,822,047 | 2/1958 | Orr et al. | 83—311 |
| 2,971,414 | 2/1961 | Owen | 83—311 X |
| 3,024,395 | 3/1962 | Pedersen et al. | 318—317 X |
| 3,308,700 | 3/1967 | Dedieu | 83—311 |
| 3,324,751 | 6/1967 | Rubinstein et al. | 83—311 X |

WILLIAM S. LAWSON, Primary Examiner

U.S. Cl. X.R.

83—311; 318—317, 328